United States Patent [19]
Fujiki et al.

[11] Patent Number: 5,326,844
[45] Date of Patent: Jul. 5, 1994

[54] PRIMER COMPOSITIONS

[75] Inventors: Hironao Fujiki, Takasaki; Masanobu Miyakoshi, Annaka; Takeo Yoshida, Annaka; Yoshifumi Inoue, Annaka; Masatoshi Arai, Annaka, all of Japan

[73] Assignee: Shin-Etsu Chemical Company, Limited, Tokyo, Japan

[21] Appl. No.: 43,852

[22] Filed: Apr. 7, 1993

[30] Foreign Application Priority Data

Apr. 7, 1992 [JP] Japan .................................. 4-114074

[51] Int. Cl.$^5$ ............................................. C08G 77/06
[52] U.S. Cl. ..................................... 528/15; 525/478; 556/438; 556/439; 556/440; 556/441; 524/859; 524/860; 524/730; 524/765; 524/792; 528/17; 528/18
[58] Field of Search ............... 556/438, 439, 440, 441; 528/41, 15, 17, 18; 525/478; 524/859, 860, 765, 730, 792

[56] References Cited

U.S. PATENT DOCUMENTS 4,332,844 6/1982 Hamada et al. .
5,180,771 1/1993 Arai et al. ........................ 556/438

FOREIGN PATENT DOCUMENTS

0392877A2 10/1990 European Pat. Off. .
0492905A1 7/1992 European Pat. Off. .
3602490A1 8/1987 Fed. Rep. of Germany .

OTHER PUBLICATIONS

"Dimethylpolysiloxane Composition" by Severnyi et al., Chemical Abstracts, vol. 84, No. 26, Jun. 28, 1976.

Primary Examiner—Melvyn I. Marquis
Attorney, Agent, or Firm—Birch, Stewart, Kolasch & Birch

[57] ABSTRACT

A primer composition has blended therein an organic silicon compound having in a molecule at least one group of the formula:

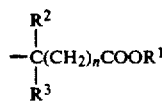

wherein $R^1$ is a monovalent hydrocarbon group or a group represented by $QSi(R^4O)_a(R^5)_{3-a}$, Q is a divalent organic group, $R^4$ and $R^5$ each are a monovalent hydrocarbon group, a is an integer of 0 to 3, $R^2$ and $R^3$ each are a hydrogen atom or a monovalent hydrocarbon group, and n is 0, 1 or 2. The primer composition is a useful adhesive since it is effective for joining silicone elastomers and similar adherends to supports such as paint coated metals and resins.

14 Claims, No Drawings

PRIMER COMPOSITIONS

BACKGROUND OF THE INVENTION

1. Field of the Invention

This invention relates to a primer composition useful for bonding adherends such as silicone elastomers to substrates such as coated metals.

2. Prior Art

Among conventional building exterior wall materials, metal members surface coated with paint compositions of fluorine resin, urethane resin or acrylic resin systems are widely utilized. Often sealants such as room temperature vulcanizable silicone elastomers of the condensation type are jointed to these coated metal members. It is also a common practice to join room temperature vulcanizable or heat curable silicone elastomers to polycarbonates, polybutylene terephthalate (PBT) resins, ABS resins and acrylic resins which are commonly used in electric and electronic applications. The recent spreading use of plastic materials in a wider variety of industrial fields raises many demands. It is one of such demands to join silicone elastomers to plastic substrates.

Silicone elastomers, however, do not provide a sufficient bond to coated metals, polycarbonates, PBT resins, acrylic resins, and other plastic materials. It is then a common practice to previously coat substrates with primer compositions based on silanes or hydrolysis condensates thereof before silicone elastomers are joined to the substrates.

A number of primer compositions have been proposed for joining silicone elastomers to substrates. For example, Japanese Patent Application Kokai (JP-A) No. 32030/1977 discloses a composition comprising a tetraorganotitanate, an epoxy group-containing alkoxysilane, an unsaturated bond-containing organic silicon compound, a platinum compound, an organic solvent-soluble polymer, and an organic solvent. Japanese Patent Publication (JP-B) No. 2107/1986 or U.S. Pat. No. 4,332,844 discloses a composition comprising an alkoxy group-containing organic silicon compound, an organic titanium compound, and a hydrosilyl group-containing organic silicon compound. These primer compositions fail to achieve a satisfactory joint in some cases. In addition, the demand for a long-lasting joint is increasing. There is a need to have a primer composition having improved bond ability and bond durability.

SUMMARY OF THE INVENTION

An object of the present invention is to provide a primer composition which is improved in bond ability and durability.

We have found that by using an organic silicon compound having at least one group of formula (1) defined below in a molecule, especially an organic silicon compound having at least one structure of formula (2) defined below, preferably in combination with an organometallic compound containing titanium or tin, there is obtained a primer composition which is effective for joining adherents such as silicone elastomers to substrates such as coated metals and resins thereby forming a long-lasting joint therebetween.

Formula (1):

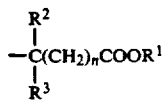

In the formula, $R^1$ is a substituted or unsubstituted monovalent hydrocarbon group or a group represented by $QSi(R^4O)_a(R^5)_{3-a}$ wherein Q is a divalent organic group, and each are a $R^4$ and $R^5$ each are a substituted or unsubstituted monovalent hydrocarbon group, and letter a is an integer of 0 to 3, $R^2$ and $R^3$ each are a hydrogen atom or a substituted or unsubstituted monovalent hydrocarbon group, and letter n is 0, 1 or 2.

Formula (2):

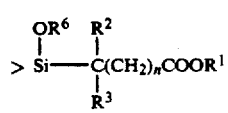

In the formula, $R^1$, $R^2$, $R^3$ and n are as defined above, and $R^6$ is a substituted or unsubstituted monovalent hydrocarbon group.

We have also found that by blending another organic silicon compound of formula (3) defined below with the above-defined component, the primer composition is further improved in bond ability and durability.

Formula (3):

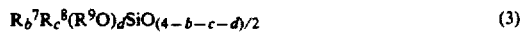

In the formula, $R^7$ is a substituted or unsubstituted monovalent hydrocarbon group, $R^8$ is a monovalent hydrocarbon group having a functional group capable of addition reaction or condensation reaction, $R^9$ is a substituted or unsubstituted monovalent hydrocarbon group, and letters b, c and d are numbers satisfying $0 \leq b \leq 3$, $0 \leq c \leq 3$, $2 \leq d \leq 4$, and $2 \leq b+c+d \leq 4$.

Accordingly, the present invention in one form provides a primer composition comprising an organic silicon compound having at least one group of formula (1) in a molecule. In another form, the present invention provides a primer composition comprising an organic silicon compound having at least one structure of formula (2) in a molecule. In one preferred embodiment, the primer composition of either the one or the other form further includes another organic silicon compound of formula (3).

DETAILED DESCRIPTION OF THE INVENTION

The first essential component of the primer composition according to the present invention is an organic silicon compound having at least one group or structure of formula (1) or (2) in a molecule.

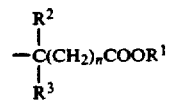

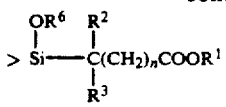

In the formulae, $R^1$ is a substituted or unsubstituted monovalent hydrocarbon group or a group represented by $QSi(R^4O)_a(R^5)_{3-a}$ wherein Q is a divalent organic group, $R^4$ and $R^5$ each are a substituted or unsubstituted monovalent hydrocarbon group, and letter a is an integer of 0 to 3. Examples of the hydrocarbon group represented by $R^1$, $R^4$ and $R^5$ include those having 1 to 16 carbon atoms, preferably 1 to 8 carbon atoms, for example, alkyl groups such as methyl, ethyl, propyl, butyl and octyl groups; cycloalkyl groups such as cyclohexyl; alkenyl groups such as vinyl; aryl groups such as phenyl; and substituted ones of these groups wherein one or more of the hydrogen atoms are replaced by halogen atoms or cyano groups. The hydrocarbon groups represented by $R^4$ may be alkoxy substituted ones. The divalent organic groups represented by Q are preferably divalent hydrocarbon groups having 1 to 8 carbon atoms which may contain an oxygen or sulfur group.

$R^2$ and $R^3$ each are a hydrogen atom or a substituted or unsubstituted monovalent hydrocarbon group having 1 to 16 carbon atoms, preferably 1 to 8 carbon atoms. Exemplary monovalent hydrocarbon groups are the same as exemplified for $R^1$ with lower alkyl groups being preferred.

$R^6$ is a substituted or unsubstituted monovalent hydrocarbon group having 1 to 16 carbon atoms, preferably 1 to 8 carbon atoms, examples of which are the same as exemplified for $R^4$.

Letter n is 0, 1 or 2.

Several illustrative, non-limiting examples of the organic silicon compound having at least one group or structure of formula (1) or (2) in a molecule are given below. It is to be noted that Me is methyl, Et is ethyl, Bu is butyl, and Pr is propyl.

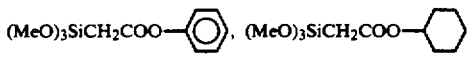

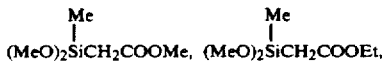

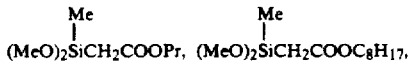

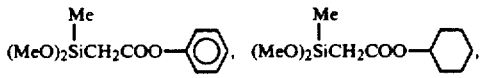

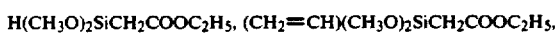

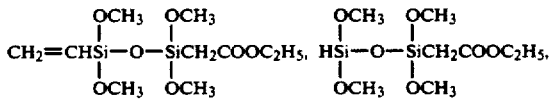

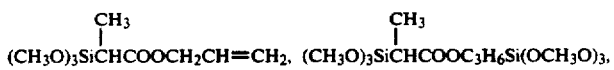

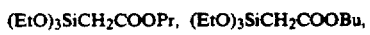

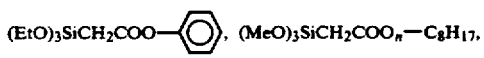

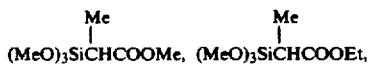

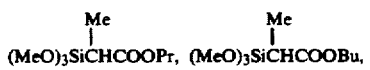

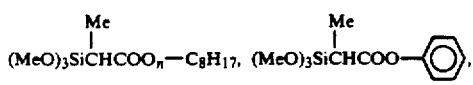

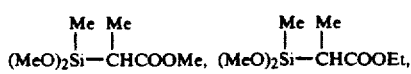

(MeO)₂Si(Me)—CH(Me)COOPr, (MeO)₂Si(Me)—CH(Me)COOBu, (MeO)₂Si(Me)—CH(Me)COOC₈H₁₇, (MeO)₂Si(Me)—CH(Me)COO—Ph, (MeO)₂Si(Ph)CHCOOMe (Me), (MeO)₂Si(Ph)CHCOOEt (Me), (MeO)₂Si(Et)—CH(Me)COOMe, (EtO)₃SiCH(Me)COOMe, (EtO)₃SiCH(Me)COOEt, (EtO)₃SiCH(Me)COOPr, (EtO)₃SiCH(Me)COOBu, (EtO)₃SiCH(Me)COOC₈H₁₇, (EtO)₃SiCH(Me)COO—Ph, (EtO)₂Si(Me)CH(Me)COOMe, (EtO)₂Si(Me)—CH(Me)COOEt, (EtO)₂Si(Me)—CH(Me)COOPr, (EtO)₂Si(Ph)CHCOOMe (Me), (EtO)₂Si(Et)—CH(Me)COOEt, (MeO)₃SiCH(Et)COOMe, (MeO)₃SiCH(Et)COOEt, (MeO)₃Si—CH(Et)(Me)COOMe, (BuO)₃SiCH₂COOMe, (BuO)₃SiCH(Me)COOEt, (C₈H₁₇)₃SiCH₂COOMe, (C₈H₁₇O)SiCH(Me)COOEt, (MeO)₃SiCH₂CH₂COOMe, (MeO)₃SiCH₂CH₂COOEt, (MeO)₃SiCH(Me)CH₂COOMe, (MeO)₃SiCH(Me)CH₂COOEt, (MeO)₃SiCH₂CH₂COOMe, (MeO)₃SiCH₂CH₂CH₂COOEt, (EtO)₃SiCH₂CH₂CH₂COOMe, (EtO)₃SiCH₂CH₂CH₂COOEt,

Me₃SiCH₂COOMe, Me₃SiCH₂COOEt,

Me₃SiCH₂COO_n—C₃H₇, Me₃SiCH₂COOO_n—Bu,

Me₃SiCH₂COO_n—C₈H₁₇, Me₃SiCH₂COO—Ph,

Et₃SiCH₂COOEt, Et—Si(Me)(Me)—CH₂COOEt,

-continued
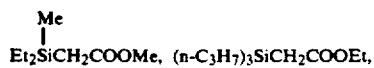
Et₂SiCH₂COOMe, (n-C₃H₇)₃SiCH₂COOEt,
(n-C₃H₇)₃SiCH₂COOMe, (n-C₃H₇)₃SiCH₂COO*n*—Bu,
(n-C₃H₇)₃SiCH₂COO*n*—C₈H₁₇,
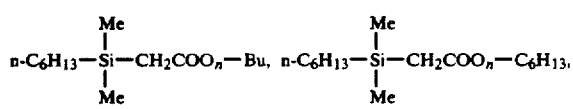
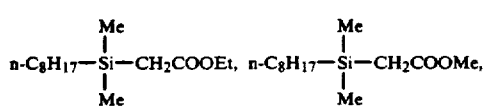
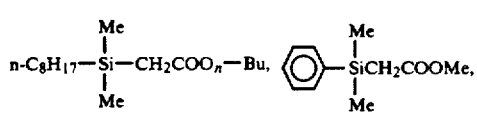
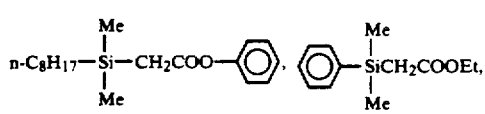
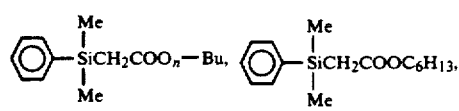
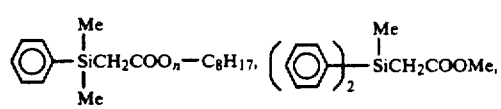
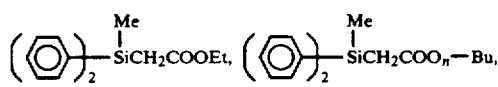
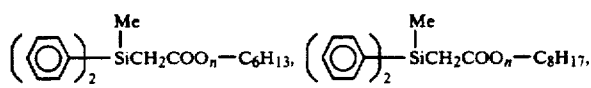
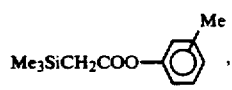
Me₃SiCH₂CH₂COOEt, Et₃SiCH₂CH₂COOMe,
Me₃SiCH₂COOEt, Me₃SiCHCOOMe,
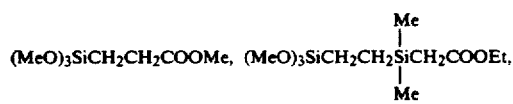
(MeO)₃SiCH₂CH₂COOMe, (MeO)₃SiCH₂CH₂SiCH₂COOEt,
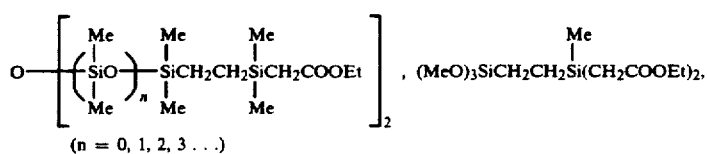
, (MeO)₃SiCH₂CH₂Si(CH₂COOEt)₂,
(n = 0, 1, 2, 3 ...)

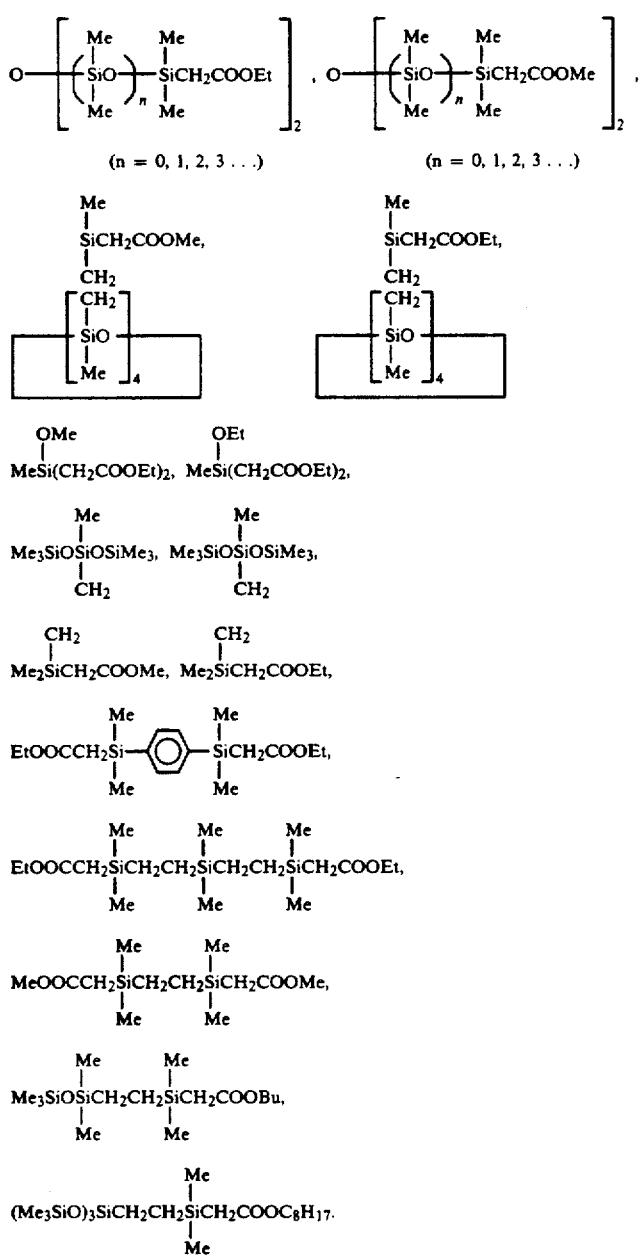

The aforementioned organic silicon compounds may be synthesized by well-known methods, for example, by subjecting α-haloesters and trimethoxychlorosilane to Reformatsky reaction in the presence of zinc compounds for dehydrochlorination. They may be more readily synthesized by α-addition between acrylic esters and hydrotrimethoxysilane through hydrosylation in the presence of platinum compound catalysts.

In one preferred embodiment of the invention, the primer composition further includes an organometallic compound. The organometallic compound not only serves to render the composition more susceptible to air drying and hence curing, but is also very effective for improving adhesion. Organic titanium and tin compounds are useful among others.

Examples of the organic titanium compound include titanate esters such as tetraisopropyltitanate, tetra-n-butyltitanate, butyltitanate dimer, tetra(2-ethylhexyl)-titanate, diethoxytitanium acetylacetonato, titanium diacetylacetonato, titanium octylglycolate, titanium lactate, titanium lactate ethyl ester, titanium triethanol aminate, and partial hydrolysis condensates thereof, partial alkoxylated chelate compounds of titanium, titanium chelate compounds, titanium silicate esters and chelate compounds thereof. The organic tin compounds include those commonly used in condensation type room temperature curable silicone compositions, for example, dibutyltin dilaurate, dibutyltin dibenzylmaleate, dibutyltin dioctoate, tin dioctylate, di-n-butyldimethoxytin, bisethylmaleyldibutyltin oxide, dibutyltin benzylmaleate, tetrabutylbis (ethylmaleate) ditin oxide, dibutyltin bis(isooctylphthalate), dibutyltin his(3-methyl-3-methoxybutylmaleate), dioctyltin bis (benzylmaleate), and dioctyltin dilaurate. These compounds may be used aloe or in admixture of two or more.

Preferably the organometallic compound is blended in an amount of about 10 to 500 parts, especially about 10 to 200 parts by weight per 100 parts by weight of the first essential component or organic silicon compound. Less than 10 parts of the organometallic compound would be less effective for improving adhesion whereas more than 500 parts is disadvantageous in economy.

Also blended in the primer composition of the invention is an organic solvent. The type and amount of the organic solvent blended may be determined by taking into account working conditions of the composition or the like. Examples include xylene, toluene, benzene, heptane, hexane, trichloroethylene, perchloroethylene, methylene chloride, ethyl acetate, ethanol, isopropanol, butanol, Fron-113, ligroin, petroleum ether, and silicone solvents. Depending on the desired evaporation rate during primer application, these solvents may be used alone or in admixture of two or more.

In addition to the first essential component or organic silicon compound having a group or structure of formula (1) or (2), the primer composition of the invention may further include another organic silicon compound of average compositional formula (3) containing at least two alkoxy groups attached to the silicon atom in a molecule. Blending of this organic silicon compound adds to bond ability and durability.

Formula (3):

$$R_b^7 R_c^8 (R^9O)_d SiO_{(4-b-c-d)/2} \quad (3)$$

In the formula, $R^7$ is a substituted or unsubstituted monovalent hydrocarbon group, $R^8$ is a monovalent hydrocarbon group having a functional group capable of addition reaction or condensation reaction, $R^9$ is a substituted or unsubstituted monovalent hydrocarbon group, and letters b, c and d are numbers satisfying $0 \leq b \leq 3$, $0 \leq c \leq 3$, $2 \leq d \leq 4$, and $2 \leq b+c+d \leq 4$.

Preferably, $R^7$ is selected from substituted or unsubstituted monovalent hydrocarbon groups having 1 to 8 carbon atoms, for example, alkyl groups such as methyl, ethyl and propyl, alkenyl groups such as vinyl, allyl and butenyl, aryl groups such as phenyl and tolyl, and substituted ones of these groups wherein one or more hydrogen atoms are replaced by halogen atoms or cyano groups. $R^8$ is selected from monovalent organic groups having 1 to 8 carbon atoms having an addition or condensation reactive group such as hydrogen atom, methacryloxy, vinyl, allyl, amino, epoxy, and mercapto groups attached to a silicon atom directly or through substituted or unsubstituted divalent hydrocarbon groups (inclusive of ether bonds). $R^9$ is selected from substituted or unsubstituted monovalent hydrocarbon groups having 1 to 8 carbon atoms, such as methyl, ethyl, propyl, butyl, pentyl, octyl and methoxyethyl groups.

Therefore, the organic silicon compound of formula (3) may be classified into tetraalkoxysilanes, organotrialkoxysilanes, diorganodialkoxysilanes, organoalkoxysiloxanes having two or more silicon atoms, and alkoxysiloxanes having two or more silicon atoms. The organoalkoxysiloxanes and alkoxysiloxanes may have any of linear, cyclic, branched and alkoxysiloxanes may have any of linear, cyclic, branched and network structures and be either homopolymers or copolymers although those which are liquid at room temperature are preferred.

Illustrative, non-limiting examples of the organic silicon compound of formula (3) include trimethoxysilane, vinyltrimethoxysilane, vinyltriethoxysilane, vinyltris($\beta$-methoxyethoxy)silane, $\gamma$-methacryloxypropyltrimethoxysilane, $\gamma$-methacryloxypropyltriethoxysilane, $\gamma$-acryloxypropyltrimethoxysilane, allyltrimethoxysilane, allyltriethoxysilane, $\gamma$-mercaptopropyltrimethoxysilane, N-$\beta$-(aminoethyl)-$\gamma$-aminopropyltrimethoxysilane, $\gamma$-aminopropyltriethoxysilane, mercaptoethyltriethoxysilane, $\gamma$-glycidoxypropyltrimethoxysilane, $\beta$-(3,4-epoxycyclohexyl)ethyltrimethoxysilane, tetramethoxysilane, tetraethoxysilane, tetrapropoxysilane, tetrabutoxysilane, and partial hydrolysis condensates of one or more of these silanes.

The amount of the organic silicon compound of formula (3) blended is preferably adjusted in accordance with the amount of the organic silicone compound of formula (1) or (2). Desirably, these organic silicon compounds are blended such that the weight ratio of formula (1) or (2) compound to formula (3) compound may range from about 5:95 to about 95:5.

Preferably a platinum or platinum group compound and an organopolysiloxane having a hydrosilyl group are added to the primer composition of the invention in addition to the above-mentioned components for improving adhesion, particularly when the composition is utilized as an adhesive for addition curing silicone elastomers.

Included in the platinum compound are platinum black, chloroplatinic acid, alcohol modified products of chloroplatinic acid, and complexes of chloroplatinic acid with olefins, aldehydes, vinylsiloxanes and acetylene alcohol.

The organopolysiloxanes having a hydrosilyl group are shown preferably by the following formulae.

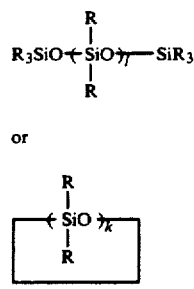

wherein R is hydrogen atom or a monovalent hydrocarbon group having 1 to 10 carbon atoms including an alkyl group (methyl, ethyl, etc.), an aryl group (phenyl, etc.) and an alkenyl group (vinyl, allyl, etc.) with proviso that at least one of Rs is hydrogen atom, and $1 \geq 0$ and $k \geq 3$.

Examples of the organohydrogensiloxane include the compounds of the following structure.

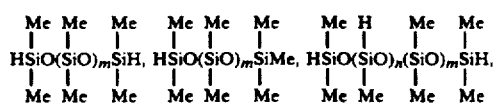

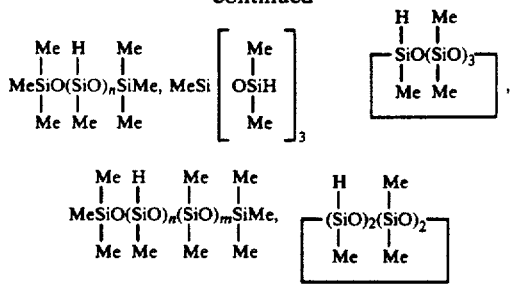

wherein n≧1, m≧0.

Understandably, chloroplatinic acid or a platinum group metal compound may be added in a catalytic amount. The amount of hydrosilyl-containing organopolysiloxane may be suitably chosen or conventional amounts commonly used for hydrosilylation reaction, and generally 0.01 to 10 parts by weight per 100 parts by weight of the first essential component.

Where it is desired to increase the thickness of a coating of the composition, addition of a vinyl-containing organopolysiloxane is effective. Various inorganic fillers such as finely divided silica may be added and mixed for the purpose of increasing the strength of a coating.

Any of other optional additives, for example, well-known heat resistant agents and coloring agents such as red iron oxide, cerium oxide, cerium hydroxide, titanium oxide, and carbon black may be added to the composition of the invention insofar as the objects of the invention are not impaired.

The primer composition of the invention may be obtained by mixing the above-mentioned components at room temperature or elevated temperature until the mixture becomes uniform. Trace amounts of water may be added if necessary.

The primer composition of the invention is used in bonding by thinly applying it to a surface of a substrate or support which has been cleaned, as by brush coating. The coating weight is a sufficient amount to form a thin primer coating on the substrate surface because larger amounts would rather adversely affect the bond between the substrate and a silicone elastomer to be subsequently coated. After application, the primer coating should preferably be air dried for 30 minutes or more before an adherend (silicone elastomer) is applied thereon. If desired, after air drying, the primer coating may be heated at about 50° to 150° C. for baking for insuring curing of the primer composition.

The substrates or supports to which the primer composition is applicable include coated articles of metal materials such as iron, stainless steel, aluminum, and nitrided steel in which paint compositions of synthetic resins such as fluoro-resins, urethane resins, and acrylic resins are coated to an outer surface for improving the weatherability and aesthetic appearance thereof and articles of polycarbonates, acrylic resins, ABS resins, polybutylene terephthalate ( PBT ) resins, polyphenyle sulfide resins, polyester resins, phenolic resins, epoxy resins, and nylon 66 as well as PFA film.

The adherends which can be joined to the substrates through the primer coating according to the present invention include well-known silicone elastomers, for example, heat curing silicone elastomers comprising diorganopolysiloxane raw rubber and fillers which are cured with organic peroxides, addition curing silicone elastomers comprising vinyl-containing diorganopolysiloxane raw rubber or oil, organohydrogenpolysiloxane and fillers which are cured with platinum series catalysts at room temperature or elevated temperatures, and condensation curing silicone elastomers comprising silanol-containing diorganopolysiloxane, hydrolyzable silane or siloxane and fillers which are cured with organic tin or titanium compounds.

There has been described a primer composition which assists in tightly joining adherends such as silicone elastomers to substrates such as coated metals and various resins while keeping the resultant joint effective over an extended period of time. The composition which is improved in both bond ability and bond durability is a useful adhesive finding use in a wider variety of applications.

EXAMPLE

Examples of the present invention are given below by way of illustration and not by way of limitation.

EXAMPLES 1-4 AND COMPARATIVE EXAMPLE 1

Five primer compositions were prepared by agitating the following components at room temperature until uniform.

| (1) | |
|---|---|
| Ethoxycarbonylethyltrimethoxysilane | 10 g |
| Tetra-n-butyltitanate | 10 g |
| n-heptane | 80 g |
| (2) | |
| Ethoxycarbonylethyltrimethoxysilane | 2 g |
| Tetra-n-butyltitanate | 10 g |
| n-heptane | 80 g |
| Tetraethoxysilane | 8 g |
| (3) | |
| Octoxycarbonylethyltrimethoxysilane | 2 g |
| Tetra-n-butyltitanate | 10 g |
| Toluene | 80 g |
| Tetraethoxysilane | 8 g |
| (4) | |
| Ethoxycarbonylethyltrimethoxysilane | 2 g |
| Dibutyltin dilaurate | 10 g |
| n-heptane | 80 g |
| Vinyltrimethoxysilane | 8 g |
| (5) | |
| Tetra-n-butyltitanate | 10 g |
| n-heptane | 80 g |
| Tetraethoxysilane | 10 g |

The substrates used were iron, aluminum, nitrided steel as metal examples and nylon 66 and PFA film surface treated with sodium vapor as plastic examples. The adherends to be joined to the substrates were silicone rubber compositions identified below.

Addition curing type: KE 1330A/B (manufactured by Shin-Etsu Chemical Co., Ltd.)
blend ratio: 100/100,
curing conditions: mold insertion and 120° C./10 min. press curing
Condensation curing type: KE 17/CATRM (manufactured by Shin-Etsu Chemical Co., Ltd. )
blend ratio: 100/0.5,
curing conditions: potting and RT/24 hr. curing
Organic peroxide curing type: KE 951IU/C-8A (manufactured by Shin-Etsu Chemical Co., Ltd.)
blend ratio: 100/0.2, curing conditions: mold insertion and 170° C./10 min. press curing The surface of the substrates was cleaned with ethanol. Each of the primer compositions was applied to the clean surface and air dried at room temperature for 30 minutes. Each of the uncured silicone rubber compositions was placed on the primer coating and cured to the substrate under appropriate curing conditions.

Adhesion was determined both at the initial and after 230° C./1,000 hr. aging (heat resistant joint) by a 180° peeling test of peeling the cured silicone rubber from the substrate. Adhesion was rated "○" for rubber failure mode, "X" for interfacial striping mode and "Δ" for mixed failure/stripping mode. The results are shown in Table 1.

composition A showed a maximum tensile stress of 7.9 kg/cm$^2$ and 100% cohesive failure at the elastomer whereas the joint formed by primer composition B showed a maximum tensile stress of 1.7 kg/cm$^2$ and 100% interfacial failure. The inventive primer composition was superior in adhesion to the comparative one.

Separately, substrates of polycarbonate were similarly coated with primer compositions A and B and a commercially available heat curing silicone elastomer composition was applied thereto and cured at 100° C. for one hour. The adhesion between the silicone elasto-

TABLE 1

| Silicone rubber | | Addition curing type KE1330 | | | | | Condensation curing type KE17 | | | | | Peroxide curing type KE951 | | | | |
|---|---|---|---|---|---|---|---|---|---|---|---|---|---|---|---|---|
| Primer | | (1) | (2) | (3) | (4) | (5) | (1) | (2) | (3) | (4) | (5) | (1) | (2) | (3) | (4) | (5) |
| Initial | Iron | ○ | ○ | ○ | ○ | ○ | ○ | ○ | ○ | ○ | x | ○ | ○ | ○ | ○ | ○ |
| | Aluminum | ○ | ○ | ○ | ○ | ○ | ○ | ○ | ○ | ○ | ○ | ○ | ○ | ○ | ○ | ○ |
| | Nitrided steel | ○ | ○ | ○ | ○ | x | ○ | ○ | ○ | ○ | x | ○ | ○ | ○ | ○ | x |
| | Nylon 66 | ○ | ○ | ○ | ○ | x | ○ | ○ | ○ | ○ | x | ○ | ○ | ○ | ○ | x |
| | PFA | ○ | ○ | ○ | ○ | x | ○ | ○ | ○ | ○ | x | ○ | ○ | ○ | ○ | x |
| Thermally aged | Iron | ○ | ○ | ○ | ○ | ○ | ○ | ○ | ○ | ○ | — | ○ | ○ | ○ | ○ | ○ |
| | Aluminium | ○ | ○ | ○ | ○ | ○ | ○ | ○ | ○ | ○ | ○ | ○ | ○ | ○ | ○ | ○ |
| | Nitrided steel | — | ○ | ○ | ○ | — | ○ | ○ | ○ | ○ | — | ○ | ○ | ○ | ○ | — |
| | PFA | ○ | ○ | ○ | ○ | — | ○ | ○ | ○ | ○ | — | ○ | ○ | ○ | ○ | — |
| | | Example | | | | Comparative Example 1 | Example | | | | Comparative Example 1 | Example | | | | Comparative Example 1 |
| | | 1 | 2 | 3 | 4 | | 1 | 2 | 3 | 4 | | 1 | 2 | 3 | 4 | |

As seen from Table 1, the primer compositions of the invention are improved in initial adhesion and aged adhesion to various substrates and thus effective for joining silicone elastomers to substrates.

EXAMPLE 5 AND COMPARATIVE EXAMPLE 2

A primer composition A (Example 5) was prepared by mixing the following components.

| | |
|---|---|
| (MeO)$_3$SiCMeHCOOEt | 5 g |
| γ-mercaptopropyltrimethoxysilane | 6 g |
| Tetrapropxy titanium | 10 g |
| Hexane | 100 g |

A primer composition B (Comparative Example 2) was prepared by mixing the same components as above, but omitting (MeO)$_3$ SiCMeHCOOEt.

Coated metal members in the form of aluminum building members coated with fluororesin paint were cleaned on their outer surface. Primer composition A or B was thinly brush coated to the fluoro-resin coated metal surface and allowed to air dry for one hour. A two-part condensation type silicone elastomer composition was applied to the primer coated surface and cured thereto. The silicone elastomer composition released N,N-diethylhydroxyamine upon curing at room temperature.

After 14 days, the adhesion between the silicone elastomer and the coated metal member was determined in accordance with JIS A578. The joint formed by primer mer and the polycarbonate was similarly determined. The joint formed by primer composition A showed a maximum tensile stress of 18.7 kg/cm$^2$ and 100% cohesive failure at the elastomer whereas the joint formed by primer composition B showed a maximum tensile stress of 5.7 kg/cm$^2$ and 100% interfacial failure.

EXAMPLES 6-12 AND COMPARATIVE EXAMPLES 3-9

Primer compositions C to P were prepared by mixing the components shown in Table 2.

Three types of coated metal members were prepared by coating aluminum building members with fluororesin, urethane resin and acrylic resin paints. Each of primer compositions C to P was thinly brush coated to the coated metal surface and allowed to air dry. The same two-part condensation type silicone elastomer composition as used in Example 5 was applied to the primer coated surface and cured thereto. After 14 days, the adhesion between the cured silicone elastomer and the coated metal member was determined as in Example 5. The results are shown in Table 3.

Separately, substrates of polycarbonate and ABS resin were similarly coated with primer compositions C to P and a commercially available heat curing silicone elastomer composition was applied thereto and cured at 120° C. for one hour. The adhesion between the silicone elastomer and the substrate was similarly determined. The results are shown in Table 4.

TABLE 2

| | Example | | | | | | | Comparative Example | | | | | | |
|---|---|---|---|---|---|---|---|---|---|---|---|---|---|---|
| | 6 | 7 | 8 | 9 | 10 | 11 | 12 | 3 | 4 | 5 | 6 | 7 | 8 | 9 |
| Primer Composition (g) | C | D | E | F | G | H | I | J | K | L | M | N | O | P |
| Organic silicon compound *1 | — | — | — | — | 40 | — | — | — | — | — | — | — | — | — |
| Organic silicon compound *2 | — | — | 70 | 20 | — | 60 | — | — | — | — | — | — | — | — |
| Organic silicon compound *3 | — | 60 | — | — | — | — | 70 | — | — | — | — | — | — | — |

TABLE 2-continued

|  | Example | | | | | | | Comparative Example | | | | | |
| --- | --- | --- | --- | --- | --- | --- | --- | --- | --- | --- | --- | --- | --- |
|  | 6 | 7 | 8 | 9 | 10 | 11 | 12 | 3 | 4 | 5 | 6 | 7 | 8 | 9 |
| γ-aminopropyltriethoxysilane | — | — | 30 | — | 65 | — | — | — | — | 30 | — | 65 | — | — |
| γ-mercaptopropyl-trimethoxysilane | 40 | — | 40 | — | — | 75 | — | 40 | — | 40 | — | — | 75 | — |
| γ-methacryloxypropyl-trimethoxysilane | — | — | — | 40 | 80 | 30 | 50 | — | — | — | 40 | 80 | 30 | 50 |
| Methyltrimethoxysilane | 140 | 130 | — | 110 | 130 | 120 | — | 140 | 130 | — | 110 | 130 | 120 | — |
| Tetrapropoxy titanium | — | 60 | — | — | — | — | — | — | 60 | — | — | — | — | — |
| Hexane | 1,000 | 1,000 | 1,000 | 1,000 | 1,000 | 1,000 | 1,000 | 1,000 | 1,000 | 1,000 | 1,000 | 1,000 | 1,000 | 1,000 |

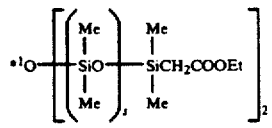

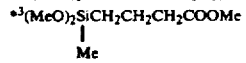

*3 (MeO)$_2$SiCH$_2$CH$_2$CH$_2$COOMe  
  |  
  Me

TABLE 3

|  |  | Primer com-position | Fluoro-resin paint coated metal | | | Urethane resin paint coated metal | | | Acrylic resin paint coated metal | | |
| --- | --- | --- | --- | --- | --- | --- | --- | --- | --- | --- | --- |
|  |  |  | Maximum tensile stress (kg/cm$^3$) | Rubbery failure (%) | Interfacial failure (%) | Maximum tensile stress (kg/cm$^3$) | Rubbery failure (%) | Interfacial failure (%) | Maximum tensile stress (kg/cm$^3$) | Rubbery failure (%) | Interfacial failure (%) |
| Example | 6 | C | 7.9 | 100 | — | 7.6 | 100 | — | 6.2 | 100 | — |
|  | 7 | D | 6.7 | 100 | — | 7.6 | 100 | — | 6.1 | 100 | — |
|  | 8 | E | 8.1 | 95 | 5 | 7.9 | 100 | — | 6.4 | 100 | — |
|  | 9 | F | 6.3 | 100 | — | 7.8 | 100 | — | 6.2 | 100 | 5 |
|  | 10 | G | 6.2 | 100 | — | 8.1 | 100 | — | 6.3 | 100 | — |
|  | 11 | H | 6.9 | 100 | — | 7.8 | 100 | — | 6.2 | 100 | — |
|  | 12 | I | 6.7 | 100 | — | 7.8 | 100 | — | 6.4 | 100 | — |
| Comparative Example | 3 | J | 3.2 | — | 100 | 3.0 | — | 100 | 2.6 | — | 100 |
|  | 4 | K | 1.1 | — | 100 | 1.2 | — | 100 | 1.3 | — | 100 |
|  | 5 | L | 1.1 | — | 100 | 1.2 | — | 100 | 1.3 | — | 100 |
|  | 6 | M | 1.1 | — | 100 | 1.7 | — | 100 | 1.6 | — | 100 |
|  | 7 | N | 2.3 | — | 100 | 2.1 | — | 100 | 2.0 | — | 100 |
|  | 8 | O | 2.7 | — | 100 | 3.1 | — | 100 | 2.3 | — | 100 |
|  | 9 | P | 2.3 | — | 100 | 2.0 | — | 100 | 2.2 | — | 100 |

TABLE 4

|  |  | Primer composition | Polycarbonate | | | ABS resin | | |
| --- | --- | --- | --- | --- | --- | --- | --- | --- |
|  |  |  | Maximum tensile stress (kg/cm$^3$) | Rubbery failure (%) | Interfacial failure (%) | Maximum tensile stress (kg/cm$^3$) | Rubbery failure (%) | Interfacial failure (%) |
| Example | 6 | C | 20.1 | 100 | — | 20.5 | 100 | — |
|  | 7 | D | 19.8 | 100 | — | 20.1 | 100 | — |
|  | 8 | E | 19.8 | 100 | — | 20.2 | 100 | — |
|  | 9 | F | 20.3 | 100 | — | 19.9 | 100 | — |
|  | 10 | G | 20.4 | 95 | 5 | 19.9 | 100 | — |
|  | 11 | H | 20.7 | 100 | — | 19.5 | 100 | — |
|  | 12 | I | 19.8 | 100 | — | 19.7 | 100 | — |
| Comparative Example | 3 | J | 6.7 | — | 100 | 4.9 | — | 100 |
|  | 4 | K | 6.1 | — | 100 | 4.8 | — | 100 |
|  | 5 | L | 5.7 | — | 100 | 4.7 | — | 100 |
|  | 6 | M | 5.9 | — | 100 | 4.7 | — | 100 |
|  | 7 | N | 5.1 | — | 100 | 4.3 | — | 100 |
|  | 8 | O | 5.2 | — | 100 | 4.3 | — | 100 |
|  | 9 | P | 5.7 | — | 100 | 4.3 | — | 100 |

As seen from Tables 3 and 4, primer compositions C to I (Examples 6 to 12) having an organic silicon compound of formula (1) blended therein had a greater maximum tensile stress and yielded rubbery failure whereas primer compositions J to P (Comparative Examples 3 to 9) free from an organic silicon compound of formula (1) showed a smaller maximum tensile stress and yielded interfacial failure in the peeling test. The inventive primer compositions are excellent in both initial adhesion and aged adhesion.

Although some preferred embodiments have been described, many modifications and variations may be made thereto in the light of the above teachings. It is therefore to be understood that within the scope of the appended claims, the invention may be practiced otherwise than as specifically described.

We claim:

1. A primer composition comprising an organic silicon compound having in a molecule at least one group of the formula (1):

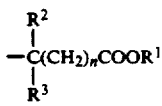

wherein
R$^1$ is a substituted or unsubstituted monovalent hydrocarbon group or a group represented by QSi(R$^4$O)$_a$(R$^5$)$_{3-a'}$
Q is a divalent organic group,
R$^4$ and R$^5$ each are a substituted or unsubstituted monovalent hydrocarbon group,
letter a is an integer of 0 to 3,
R$^2$ and R$^3$ each are a hydrogen atom or a substituted or unsubstituted monovalent hydrocarbon group,
letter n is 0, 1 or 2,
an organic titanium compound, and
an organic solvent.

2. A primer composition comprising an organic silicon compound having in a molecule at least one structure of the formula (2):

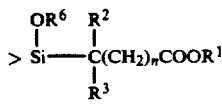

wherein
R$^1$ is a substituted or unsubstituted monovalent hydrocarbon group or a group represented by QSi(R$^4$O)$_a$(R$^5$)$_{3-a'}$
Q is a divalent organic group,
R$^4$ and R$^5$ each are a substituted or unsubstituted monovalent hydrocarbon group,
letter a is an integer of 0 to 3,
R$^2$ and R$^3$ each are a hydrogen atom or a substituted or unsubstituted monovalent hydrocarbon group,
letter n is 0, 1, or 2,
R$^6$ is a substituted or unsubstituted monovalent hydrocarbon group,
an organic titanium compound, and
an organic solvent.

3. A primer composition according to claim 1 or 2 further comprising an organic silicon compound of the average compositional formula (3):

wherein
R$^7$ is a substituted or unsubstituted monovalent hydrocarbon group,
R$^8$ is a monovalent hydrocarbon group having a functional group capable of addition reaction or condensation reaction,
R$^9$ is a substituted or unsubstituted monovalent hydrocarbon group, and
letters b, c and d are numbers satisfying $0 \leq b \leq 3$, $0 \leq c \leq 3$, $2 \leq d \leq 4$, and $2 \leq b+c+d \leq 4$.

4. A primer composition comprising an organic silicon compound having in a molecule at least one group of the formula (1):

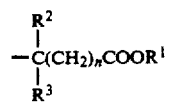

wherein
R$^1$ is a substituted or unsubstituted monovalent hydrocarbon group or a group represented by QSi(R$^4$O)$_a$(R$^5$)$_{3-a'}$
Q is a divalent organic group,
R$^4$ and R$^5$ each are a substituted or unsubstituted monovalent hydrocarbon group,
letter a is an integer of 0 to 3,
R$^2$ and R$^3$ each are a hydrogen atom or a substituted or unsubstituted monovalent hydrocarbon group,
letter n is 0, 1 or 2,
an organic titanium compound or organic tin compound, an organopolysiloxane having a hydrosilyl group, a platinum compound, and
an organic solvent.

5. A primer composition comprising an organic silicon compound having in a molecule at least one structure of the formula (2):

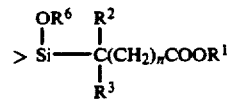

wherein
R$^1$ is a substituted or unsubstituted monovalent hydrocarbon group or a group represented by QSi(R$^4$O)$_a$(R$^5$)$_{3-a'}$
Q is a divalent organic group,
R$^4$ and R$^5$ each are a substituted or unsubstituted monovalent hydrocarbon group,
letter a is an integer of 0 to 3,
R$^2$ and R$^3$ each are a hydrogen atom or a substituted or unsubstituted monovalent hydrocarbon group,
letter n is 0, 1, or 2,
R$^6$ is a substituted or unsubstituted monovalent hydrocarbon group,
an organic titanium compound or organic tin compound, an organopolysiloxane having a hydrosilyl group, a platinum compound, and
an organic solvent.

6. A primer composition according to claim 4 or 5 further comprising an organic silicon compound of the average compositional formula (3):

wherein
R$^7$ is a substituted or unsubstituted monovalent hydrocarbon group,
R$^8$ is a monovalent hydrocarbon group having a functional group capable of addition reaction or condensation reaction,
R$^9$ is a substituted or unsubstituted monovalent hydrocarbon group, and
letters b, c and d are numbers satisfying $0 \leq b \leq 3$, $0 \leq c \leq 3$, $2 \leq d \leq 4$, and $2 \leq b+c+d \leq 4$.

7. A primer composition consisting essentially of an organic silicon compound having in a molecule at least one group of the formula (1):

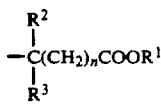 (1)

wherein
- $R^1$ is a substituted or unsubstituted monovalent hydrocarbon group or a group represented by $QSi(R^4O)_a(R^5)_{3-a'}$
- Q is a divalent organic group,
- $R^4$ and $R^5$ each are a substituted or unsubstituted monovalent hydrocarbon group,
- letter a is an integer of 0 to 3,
- $R^2$ and $R^3$ each are a hydrogen atom or a substituted or unsubstituted monovalent hydrocarbon group,
- letter n is 0, 1 or 2,
- an organic titanium compound or organic tin compound, and
- an organic solvent.

8. A primer composition consisting essentially of an organic silicon compound having in a molecule at least one group of the formula (1):

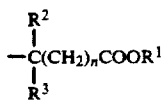 (1)

wherein
- $R^1$ is a substituted or unsubstituted monovalent hydrocarbon group or a group represented by $QSi(R^4O)_a(R^5)_{3-a'}$
- Q is a divalent organic group,
- $R^4$ and $R^5$ each are a substituted or unsubstituted monovalent hydrocarbon group,
- letter a is an integer of 0 to 3,
- $R^2$ and $R^3$ each are a hydrogen atom or a substituted or unsubstituted monovalent hydrocarbon group,
- letter n is 0, 1 or 2,
- an organic titanium compound or organic tin compound, an organic silicon compound of the average compositional formula (3):

 (3)

wherein
- $R^7$ is a substituted or unsubstituted monovalent hydrocarbon group,
- $R^8$ is a monovalent hydrocarbon group having a functional group capable of addition reaction or condensation reaction,
- $R^9$ is a substituted or unsubstituted monovalent hydrocarbon group, and
- letters b, c and d are numbers satisfying $0 \leq b \leq 3$, $0 \leq c \leq 3$, $2 \leq d \leq 4$, and $2 \leq b+c+d \leq 4$, and
- an organic solvent.

9. A primer composition consisting essentially of an organic silicon compound having in a molecule at least one structure of the formula (2):

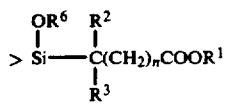 (2)

wherein

- $R^1$ is a substituted or unsubstituted monovalent hydrocarbon group or a group represented by $QSi(R^4O)_a(R^5)_{3-a'}$
- Q is a divalent organic group,
- $R^4$ and $R^5$ each are a substituted or unsubstituted monovalent hydrocarbon group,
- letter a is an integer of 0 to 3,
- $R^2$ and $R^3$ each are a hydrogen atom or a substituted or unsubstituted monovalent hydrocarbon group,
- letter n is 0, 1, or 2,
- $R^6$ is a substituted or unsubstituted monovalent hydrocarbon group,
- an organic titanium compound or organic tin compound, and
- an organic solvent.

10. A primer composition consisting essentially of an organic silicon compound having in a molecule at least one structure of the formula (2):

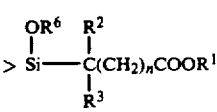 (2)

wherein
- $R^1$ is substituted or unsubstituted monovalent hydrocarbon group or a group represented by $QSi(R^4O)_a(R^5)_{3-a'}$
- Q is a divalent organic group,
- $R^4$ and $R^5$ each are a substituted or unsubstituted monovalent hydrocarbon group,
- letter a is an integer of 0 to 3,
- $R^2$ and $R^3$ each are a hydrogen atom or a substituted or unsubstituted monovalent hydrocarbon group,
- letter n is 0, 1, or 2,
- $R^6$ is a substituted or unsubstituted monovalent hydrocarbon group,
- an organic titanium compound or organic tin compound, an organic silicon compound of the average compositional formula (3):

 (3)

wherein
- $R^7$ is a substituted or unsubstituted monovalent hydrocarbon group,
- $R^8$ is a monovalent hydrocarbon group having a functional group capable of addition reaction or condensation reaction,
- $R^9$ is a substituted or unsubstituted monovalent hydrocarbon group, and
- letters b, c and d are numbers satisfying $0 \leq b \leq 3$, $0 \leq c \leq 3$, $2 \leq d \leq 4$, and $2 \leq b+c+d \leq 4$, and
- an organic solvent.

11. A primer composition consisting essentially of an organic silicon compound having in a molecule at least one structure of the formula (2):

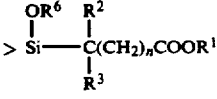 (2)

wherein
- $R^1$ is a substituted or unsubstituted monovalent hydrocarbon group or a group represented by $QSi(R^4O)_a(R^5)_{3-a'}$ Q is a divalent organic group, R$^4$ and R$^5$ each are a substituted or unsubstituted monovalent hydrocarbon group, letter a is an integer of 0 to 3, R$^2$ and R$^3$ each are a hydrogen atom or a substituted or unsubstituted monovalent hydrocarbon group, letter n is 0, 1, or 2, R$^6$ is a substituted or unsubstituted monovalent hydrocarbon group, an organic titanium compound or organic tin compound, an organopolysiloxane having a hydrosilyl group, a platinum compound, and an organic solvent.

12. A primer composition consisting essentially of an organic silicon compound having in a molecule at least one structure of the formula (2):

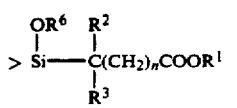 (2)

wherein

R$^1$ is a substituted or unsubstituted monovalent hydrocarbon group or a group represented by QSi(R-$^4$O)$_a$(R$^5$)$_{3-a'}$ Q is a divalent organic group, R$^4$ and R$^5$ each are a substituted or unsubstituted monovalent hydrocarbon group, letter a is an integer of 0 to 3, R$^2$ and R$^3$ each are a hydrogen atom or a substituted or unsubstituted monovalent hydrocarbon group, letter n is 0, 1 or 2, R$^6$ is a substituted or unsubstituted monovalent hydrocarbon group, an organic titanium compound or organic tin compound, an organopolysiloxane having a hydrosilyl group, a platinum compound, an organic silicon compound of the average compositional formula (3):

 (3)

wherein

R$^7$ is a substituted or unsubstituted monovalent hydrocarbon group,

R$^8$ is a monovalent hydrocarbon group having a functional group capable of addition reaction or condensation reaction, R$^9$ is a substituted or unsubstituted monovalent hydrocarbon group, and letters b, c and d are numbers satisfying $0 \leq b \leq 3$, $0 \leq c \leq 3$, $2 \leq d \leq 4$, and $2 \leq b+c+d \leq 4$, and an organic solvent.

13. A primer composition consisting essentially of an organic silicon compound having in a molecule at least one group of the formula (1):

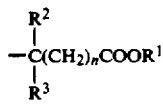 (1)

wherein

R$^1$ is a substituted or unsubstituted monovalent hydrocarbon group or a group represented by QSi(R-$^4$O)$_a$(R$^5$)$_{3-a'}$ Q is a divalent organic group, R$^4$ and R$^5$ each are a substituted or unsubstituted monovalent hydrocarbon group, letter a is an integer of 0 to 3, R$^2$ and R$^3$ each are a hydrogen atom or a substituted or unsubstituted monovalent hydrocarbon group, letter n is 0, 1 or 2, an organic titanium compound or organic tin compound, an organopolysiloxane having a hydrosilyl group, a platinum compound, and an organic solvent.

14. A primer composition consisting essentially of an organic silicon compound having in a molecule at least one group of the formula (1):

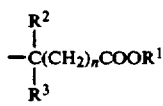 (1)

wherein

R$^1$ is a substituted or unsubstituted monovalent hydrocarbon group or a group represented by QSi(R-$^4$O)$_a$(R$^5$)$_{3-a'}$ Q is a divalent organic group, R$^4$ and R$^5$ each are a substituted or unsubstituted monovalent hydrocarbon group, letter a is an integer of 0 to 3, R$^2$ and R$^3$ each are a hydrogen atom or a substituted or unsubstituted monovalent hydrocarbon group, letter n is 0, 1 or 2, an organic titanium compound or organic tin compound, an organopolysiloxane having a hydrosilyl group, a platinum compound, an organic silicon compound of the average compositional formula (3):

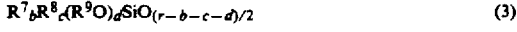 (3)

wherein

R$^7$ is a substituted or unsubstituted monovalent hydrocarbon group,

R$^8$ is a monovalent hydrocarbon group having a functional group capable of addition reaction or condensation reaction, R$^9$ is a substituted or unsubstituted monovalent hydrocarbon group, and letters b, c and d are numbers satisfying $0 \leq b \leq 3$, $0 \leq c \leq 3$, $2 \leq d \leq 4$, and $2 \leq b+c+d \leq 4$, and an organic solvent.

* * * * *